(12) United States Patent
Fye (10) Patent No.: US 9,290,331 B2
(45) Date of Patent: Mar. 22, 2016

(54) DIVERTER CONVEYOR AND RELATED METHODS

(71) Applicant: SPAN TECH LLC, Glasgow, KY (US)

(72) Inventor: Stephen C. Fye, Glasgow, KY (US)

(73) Assignee: SPAN TECH LLC, Glasgow, KY (US)

( * ) Notice: Subject to any disclaimer, the term of this patent is extended or adjusted under 35 U.S.C. 154(b) by 0 days.

(21) Appl. No.: 14/298,343

(22) Filed: Jun. 6, 2014

(65) Prior Publication Data

US 2015/0353294 A1    Dec. 10, 2015

(51) Int. Cl.
*B65G 47/10* (2006.01)
*B65G 47/46* (2006.01)
*B65G 47/52* (2006.01)

(52) U.S. Cl.
CPC ..................................... *B65G 47/52* (2013.01)

(58) Field of Classification Search
CPC ..... B65G 47/08; B65G 47/482; B65G 47/642
USPC ............ 198/370.01, 370.02, 370.07, 370.08, 198/457.05, 617
See application file for complete search history.

(56) References Cited

U.S. PATENT DOCUMENTS

| | | |
|---|---|---|
| 2,784,851 A | 3/1957 | Bretschneider |
| 3,157,270 A | 11/1964 | Prucha et al. |
| 3,727,758 A | 4/1973 | Cleland |
| 3,731,782 A | 5/1973 | Del Rosso |
| 3,807,314 A | 4/1974 | Slemmons |
| 3,938,647 A | 2/1976 | Raque |
| 4,147,248 A | 4/1979 | Kurczak et al. |
| 4,618,052 A | 10/1986 | Rickett et al. |
| 4,896,760 A | 1/1990 | Triantafilou et al. |
| 5,409,095 A | 4/1995 | Hoshi et al. |
| 5,613,591 A | 3/1997 | Heit et al. |
| 5,967,289 A | 10/1999 | Kelsey |
| 6,615,972 B2 | 9/2003 | Veit et al. |
| 6,923,308 B2 | 8/2005 | Veit |
| 6,951,274 B2 | 10/2005 | Zeitler et al. |
| 7,055,669 B2 | 6/2006 | Veit |
| 7,086,519 B2 * | 8/2006 | Veit et al. ................. 198/370.02 |
| 7,240,781 B2 | 7/2007 | Ramaker et al. |
| 7,284,652 B2 | 10/2007 | Zeitler et al. |
| 7,410,045 B2 * | 8/2008 | Patterson et al. ........ 198/370.07 |
| 7,516,835 B2 * | 4/2009 | Neiser et al. ............ 198/370.02 |
| 7,690,496 B1 | 4/2010 | Fye et al. |
| 8,770,379 B2 * | 7/2014 | Van Den Goor et al. 198/370.02 |
| 2006/0254880 A1 * | 11/2006 | Van Scchaijk et al. |
| 2008/0011581 A1 | 1/2008 | Ford |

FOREIGN PATENT DOCUMENTS

WO    2005076906 A2    8/2005

* cited by examiner

*Primary Examiner* — Douglas Hess
(74) *Attorney, Agent, or Firm* — King & Schickli, PLLC (57) ABSTRACT

A diverter is for intended use in connection with a diverter conveyor for diverting articles moving in a conveying direction from a primary path of travel to one of three different optional paths of downstream travel. The diverter includes a plurality of guides, each mounted for relative movement thereto from a first position to a second position. Depending on the position, the diverter is caused to follow one of the several downstream paths of travel. Related aspects include a conveyor incorporating the diverter and methods of use and manufacture.

21 Claims, 12 Drawing Sheets

DIVERTER CONVEYOR AND RELATED METHODS

TECHNICAL FIELD

This disclosure relates generally to conveyors and, more particularly, to a conveyor for diverting articles being conveyed.

BACKGROUND OF THE INVENTION

Systems for selectively diverting conveyed articles in a direction transverse to the conveying direction are well known. The typical arrangement includes a conveyor associated with a plurality of diverters (sometimes called "carriers") for engaging the articles. As the conveyor moves in an endless path, an adjacent guide track engages a guide associated with each diverter. In the usual mode of operation, this engagement causes the diverter and the associated article to move laterally along the conveyor. Using such an arrangement advantageously allows for selective placement of the articles into multiple rows or lanes, as necessary or desired for a downstream operation, or alternatively may simply divert selected articles to a takeaway conveyor for further processing.

Currently, most diverter systems are adapted for moving articles from a position along the lateral side of the conveyor across the conveying surface to a position closer to the opposite side of the conveyor. However, it is desirable in some applications to provide for diversion from a central position along the conveying surface to either lateral side of the conveyor, or possibly to allow for the continued unaltered conveyance of the diverter in the central position (which may provide a significant reduction in wear as a result of the lack of a need for specific guidance in such position). Accordingly, a need is identified for a diverter conveyor that addresses and overcomes the foregoing limitations, as well as possibly others.

SUMMARY OF THE INVENTION

One aspect of the invention pertains to an apparatus for intended use in connection with a conveyor for conveying articles in a conveying direction along at least three different paths. The apparatus includes a diverter for moving in the conveying direction along an intermediate path of travel. The diverter includes a plurality of movable guides including a first guide mounted for relative movement to a first position corresponding to a first path of diverter travel closer to one side of the conveyor and a second guide mounted for relative movement to a second position corresponding to a second path of diverter travel closer to a second side of the conveyor. A switch includes a first condition for engaging the first guide to cause the diverter to follow the first path, a second condition for engaging the second guide to cause the diverter to follow the second path, or a third condition for allowing the diverter to follow the intermediate path of travel.

In one embodiment, the switch comprises a first portion adapted for engaging the first guide in the first position and a second portion adapted for engaging the second guide in the second position. An actuator may be provided for moving the first portion of the switch to engage the first guide and the second portion of the switch to engage the second guide. A limiter may also be provided for limiting the stroke of the actuator. The actuator may comprise a first actuator connected to the first portion of the switch and a second actuator connected to the second portion of the switch.

A first magnetic coupling may be provided for holding the first guide in either the first position or the second position, and a second magnetic coupling for holding the second guide in either the first position or the second position. A reset guide upstream of the switch may be provided for moving the first guide to the second position and the second guide to the first position. A first divider downstream of the switch may be provided for engaging the first guide in the first position and a second divider downstream of the switch may be provided for engaging the second guide in the second position. A dead zone may be provided between the switch and the first or second dividers.

A method for conveying articles in a conveying direction along a first path of travel or a second path of travel is also disclosed. The method comprises conveying a diverter including a plurality of guides including a first guide mounted for movement to a first position adjacent one side of the diverter corresponding to the first path of travel and a second guide mounted for movement to a second position adjacent another side of the diverter corresponding to the second path of travel. The method further comprises holding each guide in either the first position or the second position by way of a magnetic coupling between the diverter and the guide. The method may further include the step of moving the guide between the first and second positions.

A further aspect of the disclosure pertains to an apparatus for intended use in connection with a conveyor for conveying articles in a conveying direction. The apparatus comprises at least one diverter for moving in the conveying direction along a central path of travel. The diverter includes a first movable guide mounted for relative movement to a first position corresponding to a first path of diverter travel closer to one side of the conveyor and a second position corresponding to the central path of travel. A switch is provided for engaging the first guide to cause the diverter to follow the first path.

In one embodiment, the diverter includes a second guide mounted for relative movement to a third position corresponding to a second path of diverter travel closer to one side of the conveyor and a fourth position. The switch may comprise a first portion adapted for engaging the first guide in the first position and a second portion adapted for engaging the second guide in the third position. An actuator may be provided for moving the first portion of the switch to engage the first guide and the second portion of the switch to engage the second guide, and a limiter for limiting the stroke of the actuator. The actuator may comprise a first actuator connected to the first portion of the switch and a second actuator connected to the second portion of the switch.

A first magnetic coupling may be provided for holding the first guide in either the first position or the second position. A reset guide may be provided upstream of the switch for moving the first guide to the second position. A first divider downstream of the switch may be provided for engaging the first guide in the first position.

DETAILED DESCRIPTION OF THE INVENTION

Figure 1:
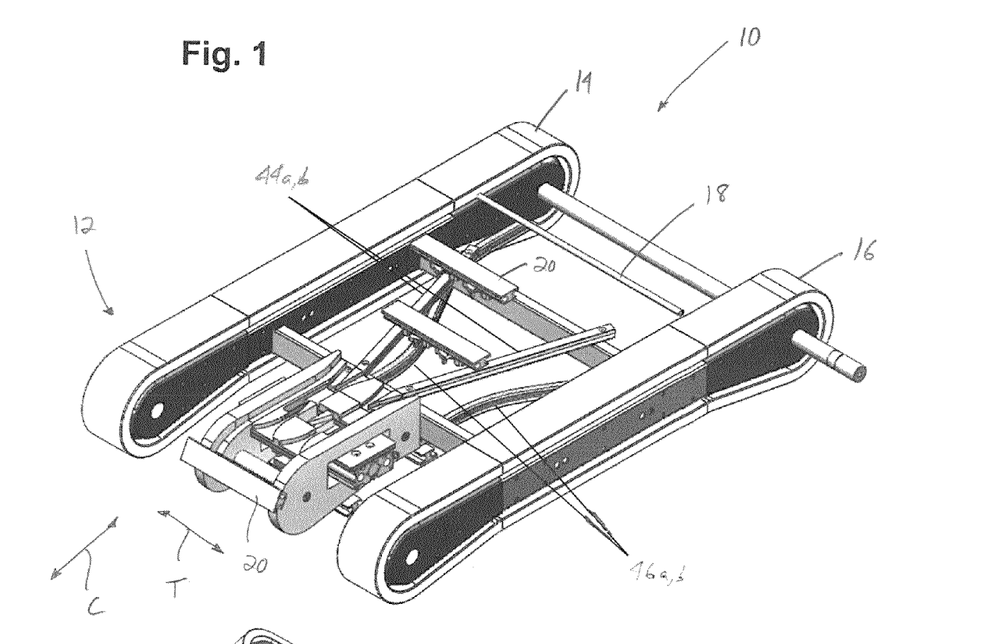
FIGS. 1 and 1a are top and bottom perspective views of a conveyor for use in connection with the diverter forming one of the many inventions described herein.

Reference is now made to FIG. 1, which illustrates a diverter system 10 for use in diverting articles being conveyed. The system 10 as shown includes a driven conveyor 12 comprised of a first endless conveyor 14 (including a chain; not shown), a second endless conveyor 16 spaced from the first chain, one or more associated diverters 20 for supporting or engaging the article(s) being conveyed (preferably, on its upper or article engaging surface S), and diverter support (in the form of transverse rods 18) positioned between the conveyors 14, 16. In the illustrated embodiment, the association with the support rods 18 is such that the diverter 20 is capable of slidably moving relative to the support in a transverse or lateral direction T relative to the conveying or longitudinal direction C along a forward run in response to the influence of an externally applied force in order to divert articles transversely across the conveying surface (such as for forming lanes on a downstream conveyor, or for moving selected articles onto an associated takeaway conveyor (not shown)). The details of an exemplary diverter construction may be found in Applicant's international patent application PCT/US05/003497, the disclosure of which is incorporated herein by reference, as well as in U.S. Pat. No. 7,690,496, which is also incorporated herein by reference.

Figure 2:
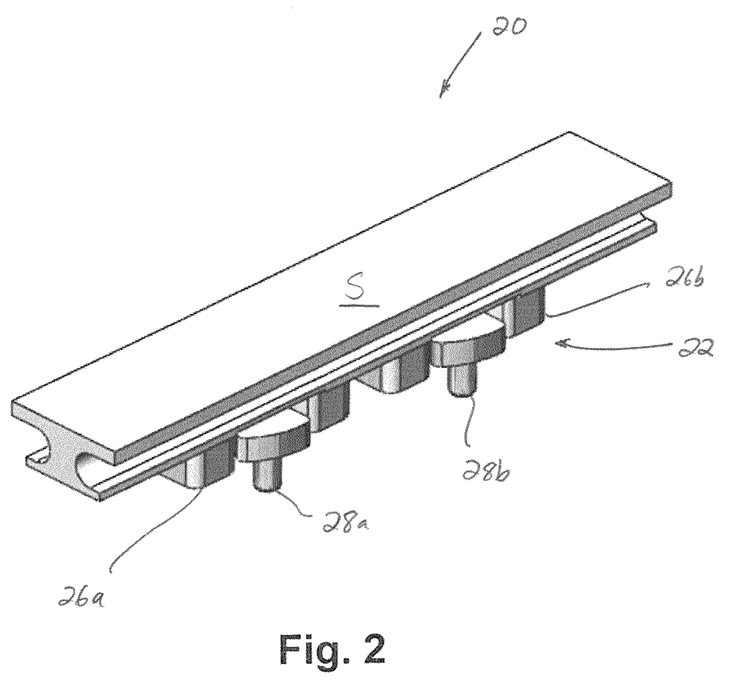
FIG. 2 is a perspective view of a diverter including two guides.

Viewing also FIG. 2, each diverter 20 may be associated with a guide assembly 22 for use in causing it to move selectively in the transverse direction T (or not) depending on its association with a corresponding guide structure (as will be discussed in more detail below). This guide assembly 22 may mount to the underside of the diverter 20, such as by using fasteners, as outlined in the '496 patent. The guide assembly 22 includes a pair of guide bodies 26a, 26b, each associated with a movably mounted guide 28a, 28b positioned in an associated recess or cavity. Each guide 28a, 28b is mounted for movement within the recess or cavity between a first position and a second position, the significance of which will be outlined in the following description.

In order to maintain the guide 28a, 28b in either the first or second position, and thus determine the path of travel in the conveying direction C, a magnetic coupling may be provided. This magnetic coupling may be formed between the corresponding parts of the bodies 26a, 26b of the diverter 20 and the associated guides 28a, 28b. In the illustrated embodiment, and as perhaps best understood viewing FIG. 3, this is accomplished by associated magnets M positioned in the bodies 26a, 26b and forming the guides 28a, 28b of a magnetic material for forming the desired magnetic coupling, and most preferably comprises a ferromagnetic material. However, the opposite arrangement could also be used instead.

Figure 3:
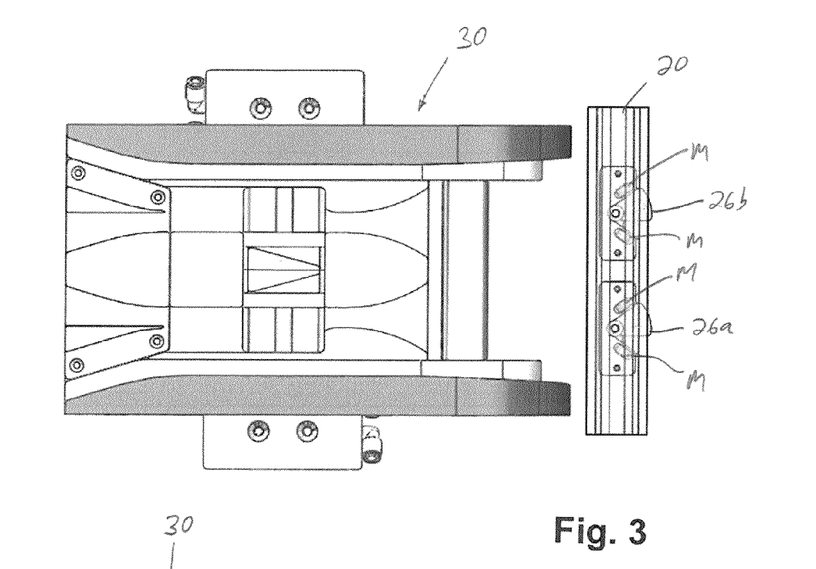
FIGS. 3 and 4 are top and perspective views of a switch, illustrating in particular the guides for traversing a switch.
Figure 4:
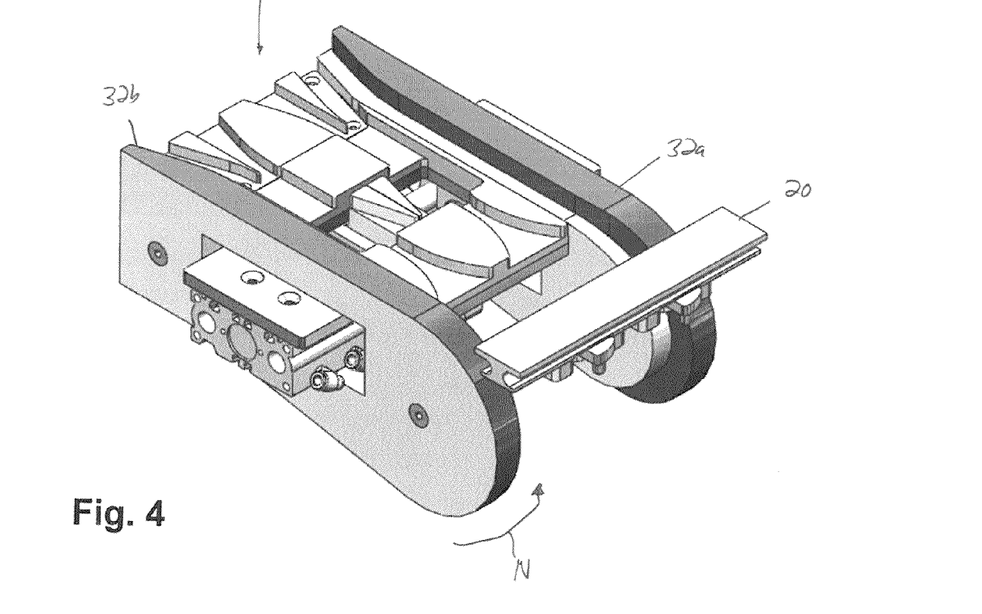

Turning now to FIGS. 3 and 4, the details of a switch 30 for switching the position of the guides 28a, 28b is shown. Firstly, it is noted that the switch 30 includes optional spaced body guides 32a, 32b, which are designed to receive and guide the diverters 20 as a result of the engagement with the corresponding guide bodies 26a, 26b (It should be understood that the diverter 20 in FIG. 4 is showed spaced from the conveyor 12 for purposes of illustration only). Thus, the body guides 32a, 32b may be considered to provide a centering function for the guides 28a, 28b relative to the switch 30. As can be appreciated from viewing FIG. 5, the end of the body guides 32a, 32b may be rounded and thus used for transitioning the diverters 20 from the return to the forward run of the conveyor 12 (see action arrow N).

Figure 5:
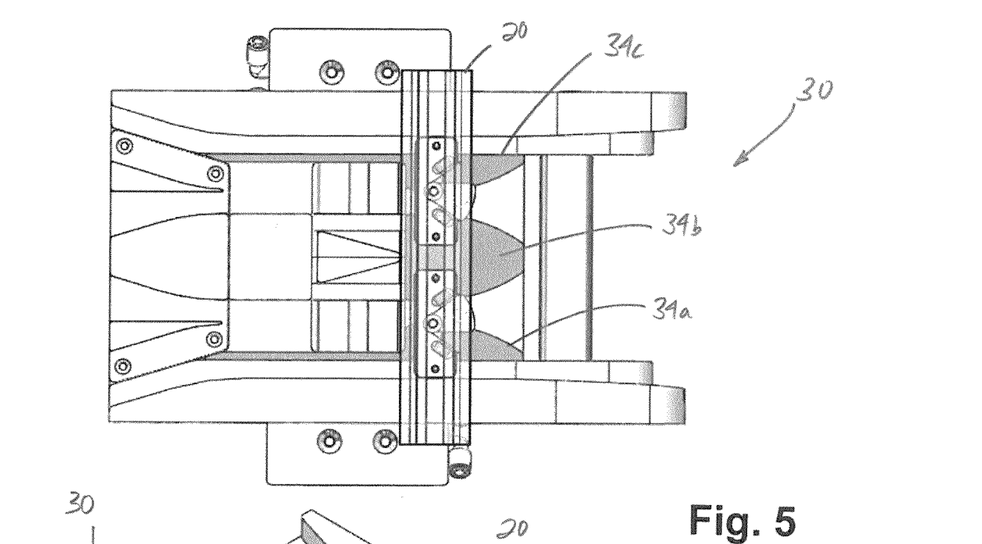
FIGS. 5 and 6 are top and perspective views of the switch of FIG. 3, illustrating in particular reset guides.
Figure 6:
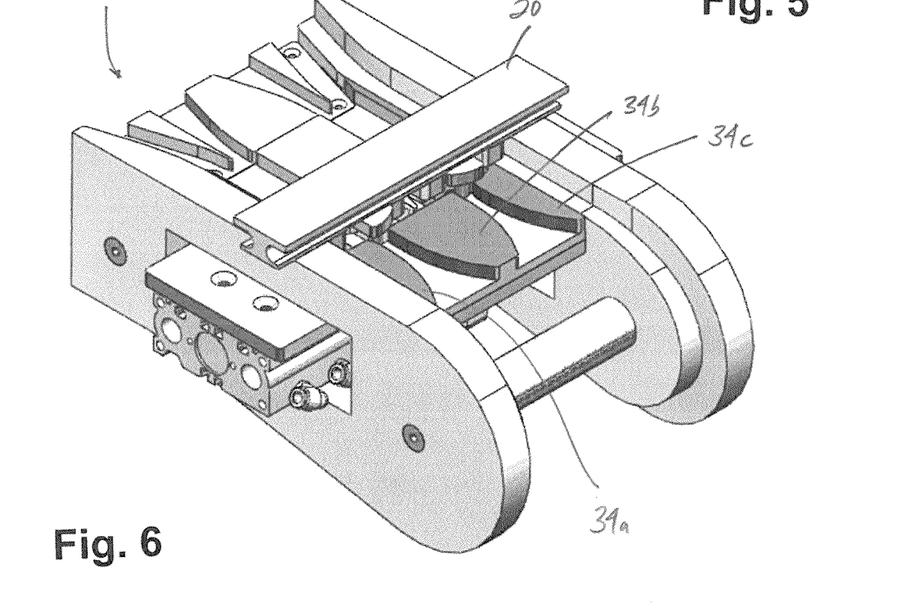
Figure 7:
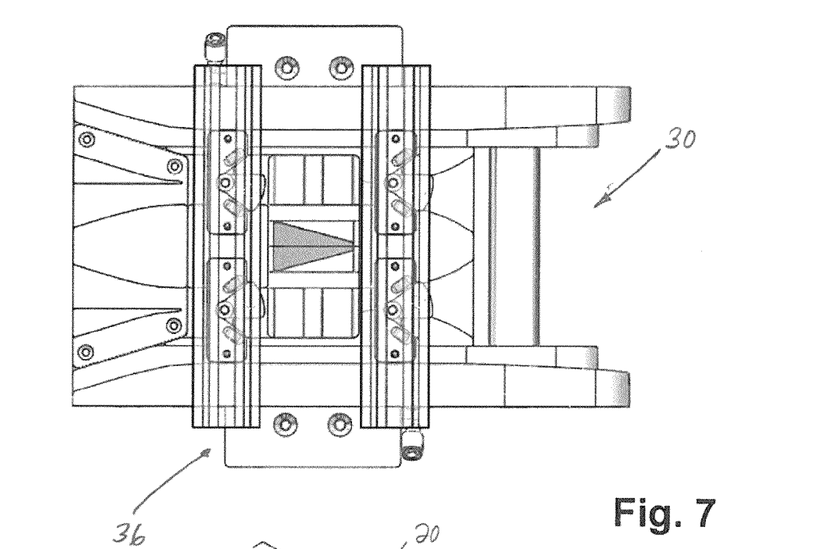
FIGS. 7-10 are top and perspective views of the switch of FIG. 3, illustrating in particular the switch in a first condition.
Figure 8:
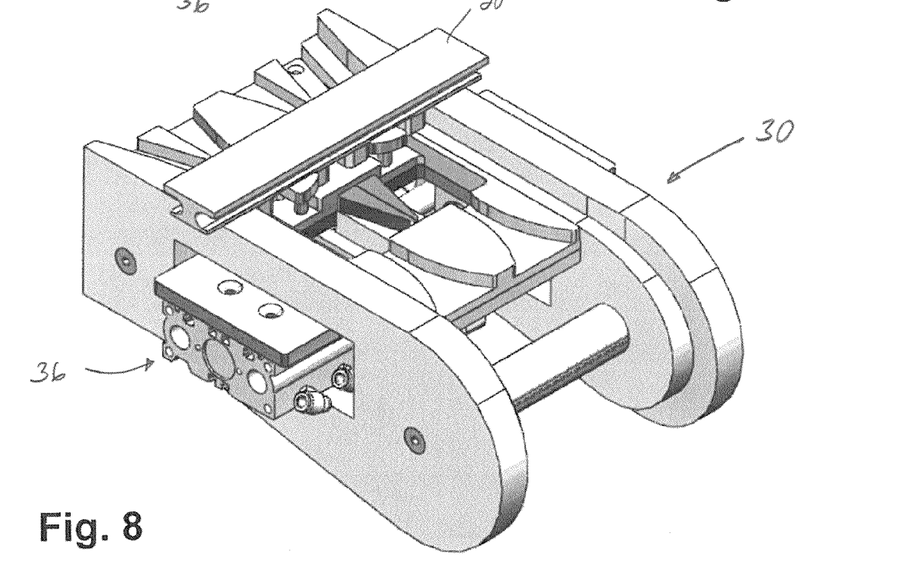
Figure 9:
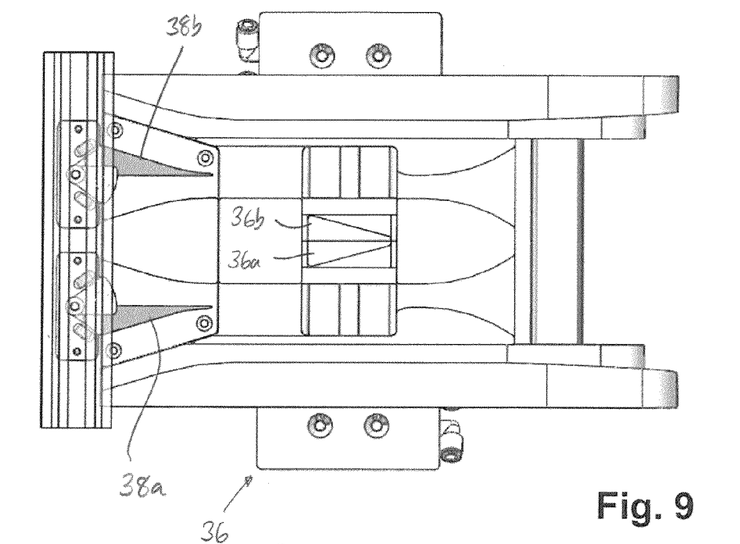
Figure 10:
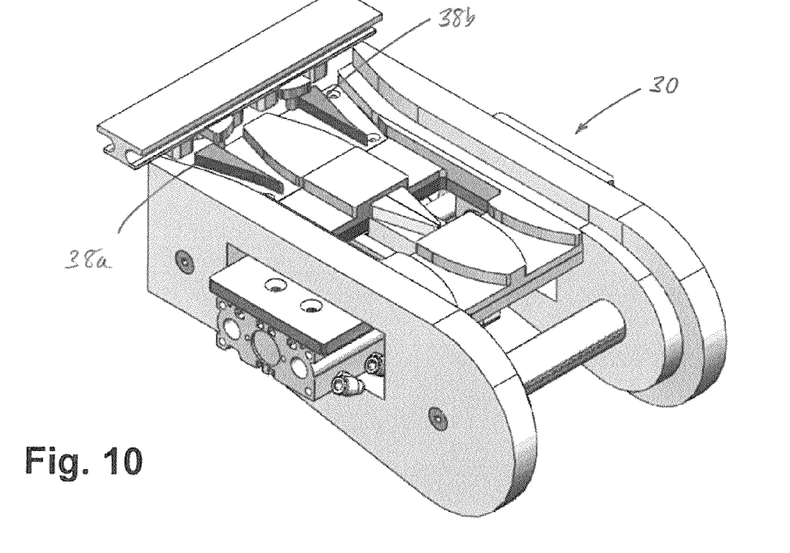

The switch 30 also includes reset guides 34a, 34b, 34c, as shown in FIGS. 5 and 6. These guides 34a-34c engage the guides 28a, 28b and force them to a default position, which in this embodiment corresponds to a central position relative to the lateral sides of the conveyor 12 when the switch 30 is in the home condition. Hence, with reference to FIGS. 7 and 8, an upstream actuator 36 in a home position allows the guides 28a, 28b of the diverter 20 (guide 28a in the second position, and guide 28b in the first position) to pass downstream through the switch unaffected, and results in no diversion activity. In other words, downstream dividers 38a, 38b (see FIGS. 9 and 10) are not engaged and the diverter 20 travels past the switch 30 in the home or intermediate position.

Figure 11:
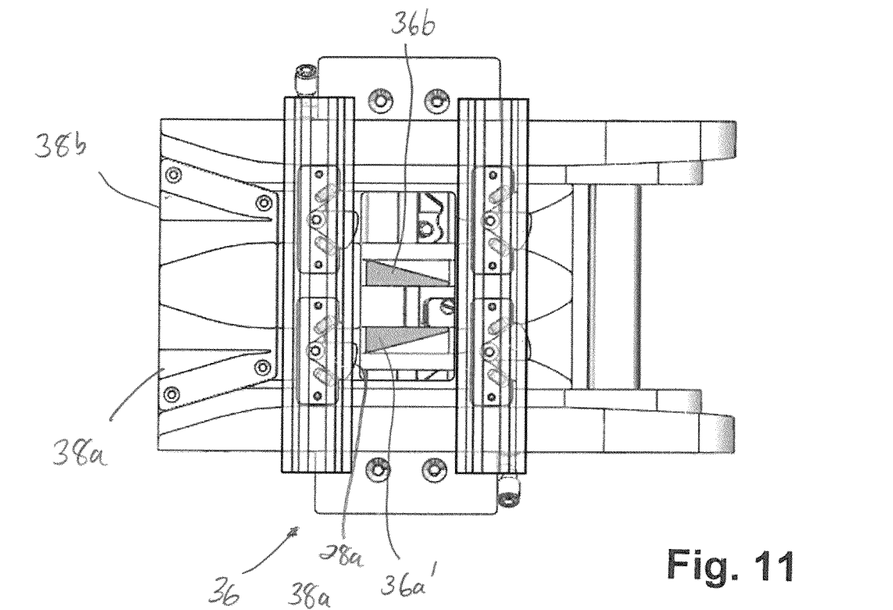
FIGS. 11-14 are top and perspective views of the switch of FIG. 3, illustrating in particular the switch in a second condition.
Figure 12:
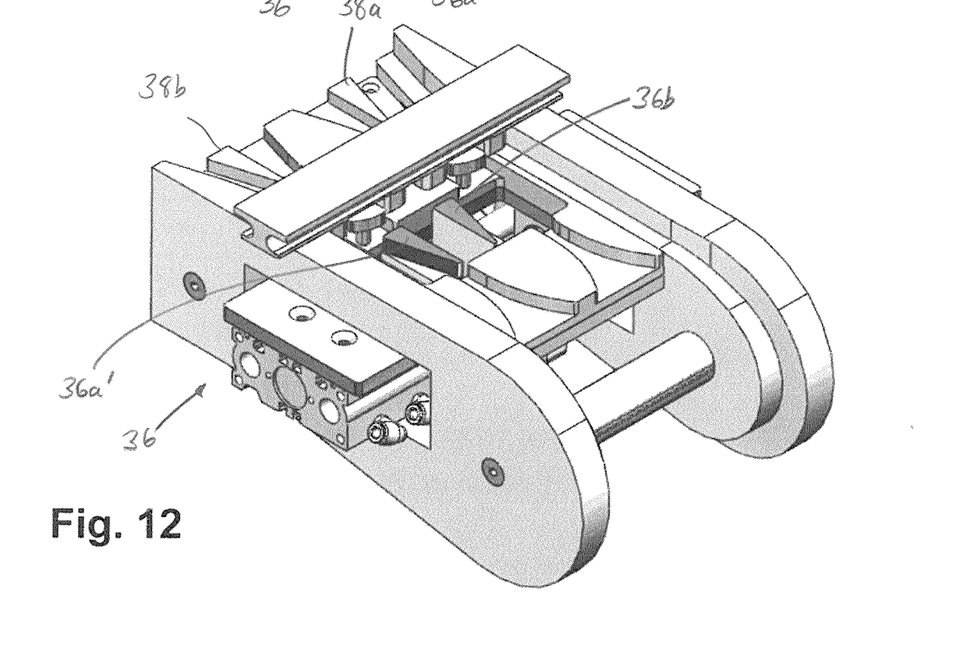
Figure 13:
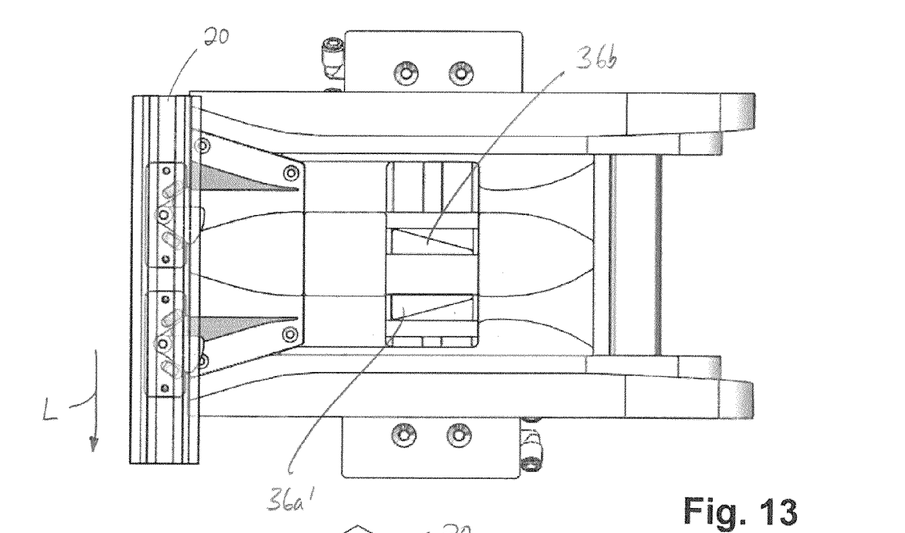
Figure 14:
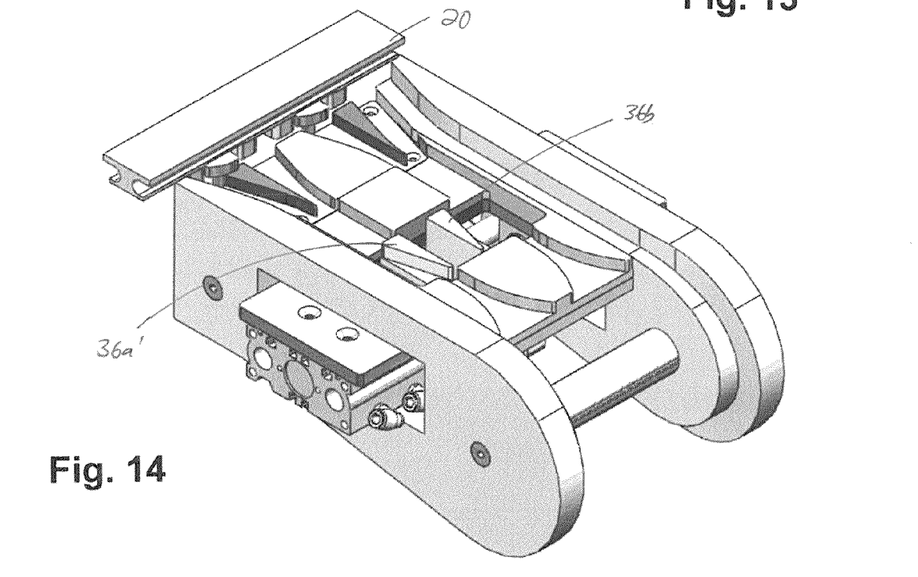

However, in alternate positions of the actuator 36, a first portion 36a (which is tapered in the conveying direction C) is moved (note position 36a') to cause the guide 28a in the first position to divert, as shown in FIGS. 11 and 12. As a result of downstream guidance provided by the divider 38a, the diverter 20 is caused to move from the home or intermediate position along a path of travel toward a position closer to one lateral side of the conveyor 12, as shown in FIGS. 13 and 14 (note arrow L for left). The opposite guide 28b remains unaffected.

Figure 15:
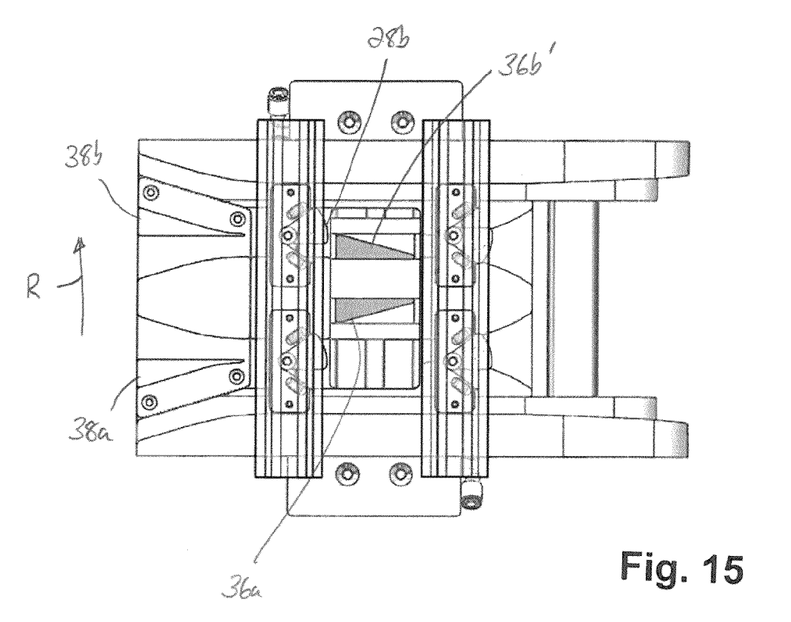
FIGS. 15-18 are top and perspective views of the switch of FIG. 3, illustrating in particular the switch guides in a third condition.
Figure 16:
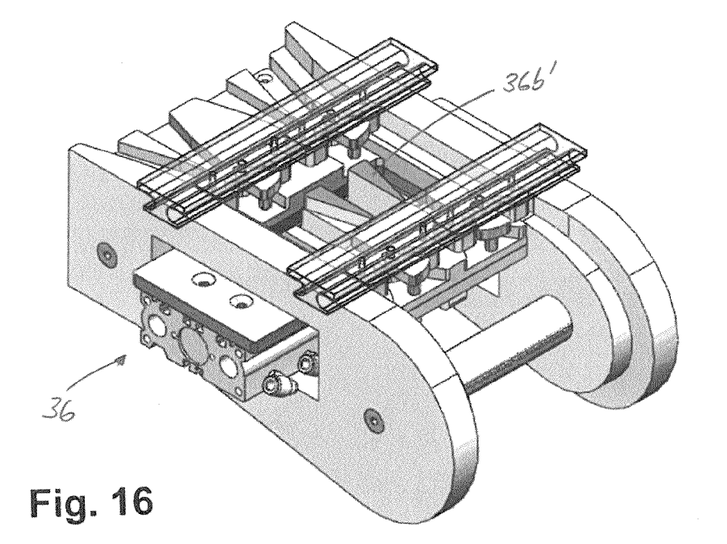
Figure 17:
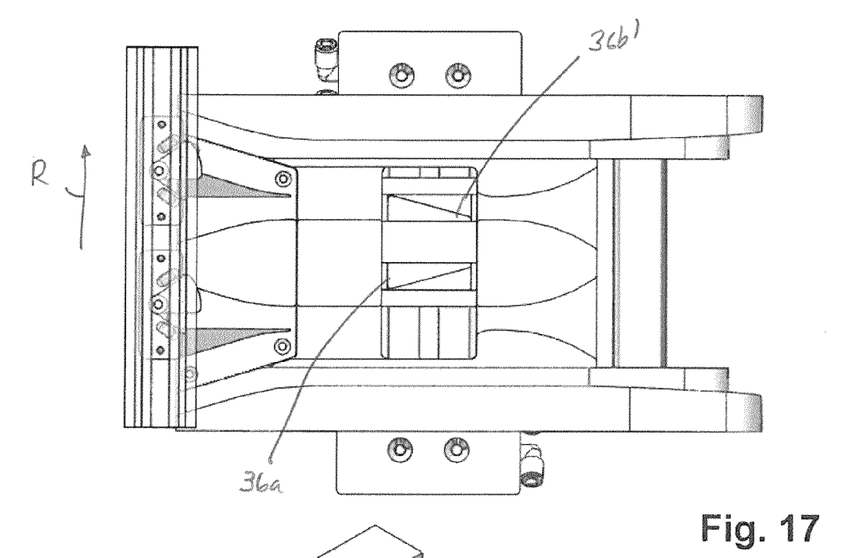
Figure 18:
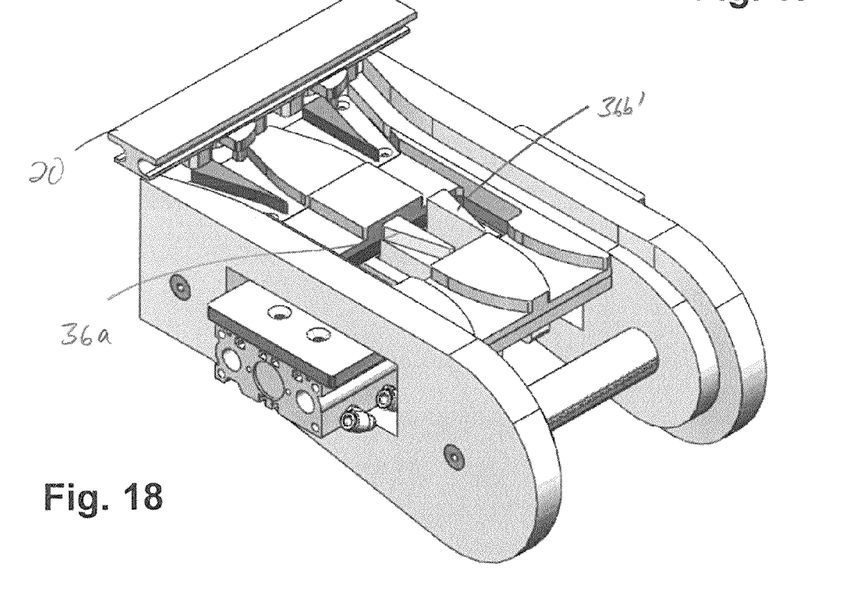

Likewise, in another position of the actuator 36, a second portion 36b (also tapered) is moved (note position 36b') to cause the guide 28b to divert to a second position, as shown in FIGS. 15 and 16. As a result of downstream guidance provided by the divider 38b, the diverter 20 is caused to move from the home or intermediate position toward a second path of travel closer to another lateral side of the conveyor 12, as shown in FIGS. 17 and 18 (note arrow R for right). The opposite guide 28a remains unaffected.

Figure 19:
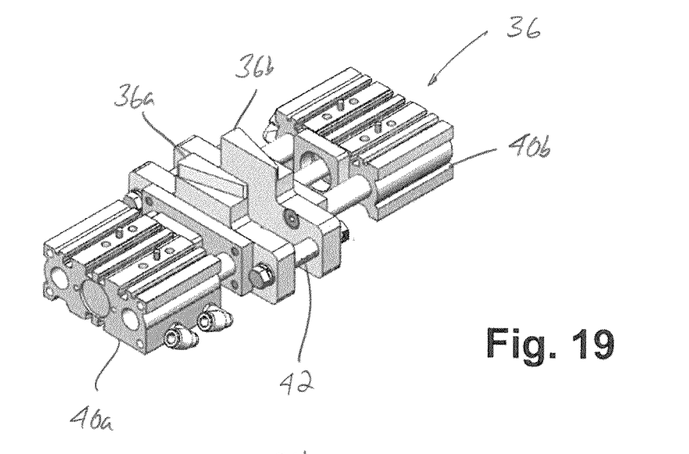
FIGS. 19-21 are perspective views of the actuator illustrating the various positions.
Figure 20:
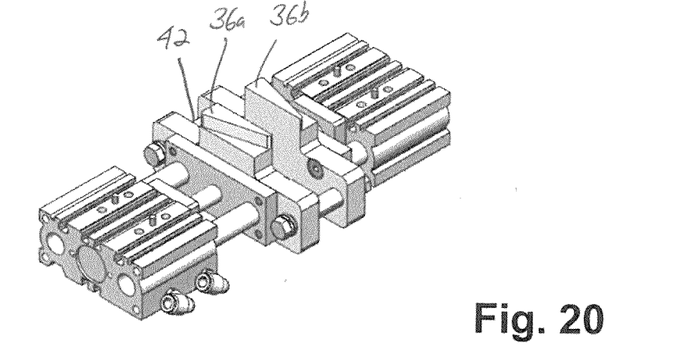
Figure 21:
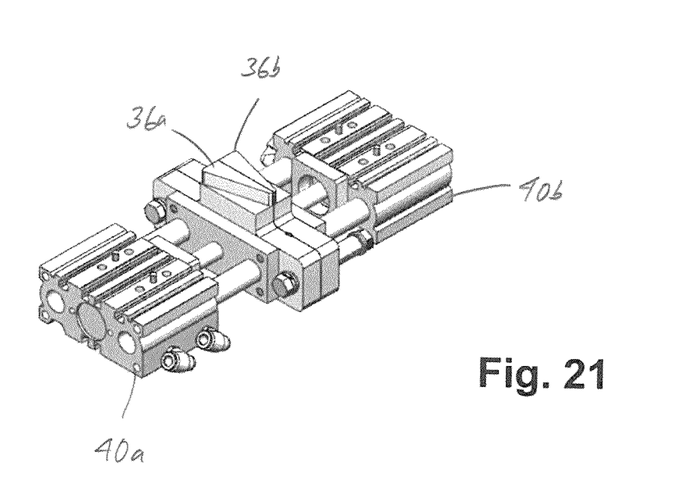

Details of one possible construction of the actuator 36 are shown in FIGS. 19-21. It can be understood that the actuator comprises a pair of linear actuators, such as pressurizable cylinders 40a, 40b, associated with each portion 36a, 36b of the actuator 36. When both cylinders 40a, 40b are fully extended, as shown in FIG. 21, the portions 36a, 36b are brought together and the diverter 12 position remains unchanged, as described in the foregoing discussion. When each cylinder 40a or 40b is retracted, the corresponding portions 36a, 36b assume a corresponding position for engaging the guide 28a, 28b and causing diversion (compare FIGS. 19 and 20). Floating stroke limiting rods 42 connecting the portions 36a, 36b and with oversized heads prevent the cylinders 40a, 40b from causing actuation to a position in which a crash would occur as the result of simultaneous actuation.

Figure 22:
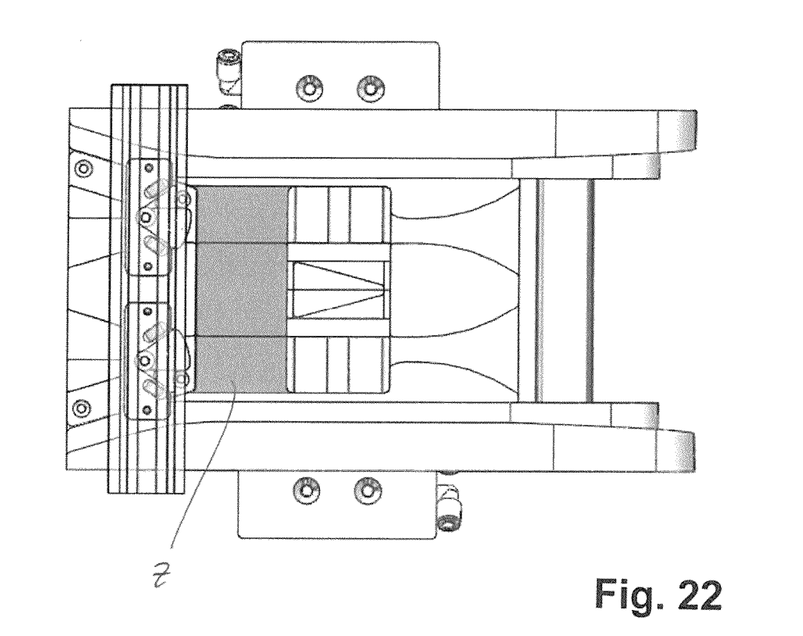
FIGS. 22 and 23 illustrate a toggle position rest zone.
Figure 23:
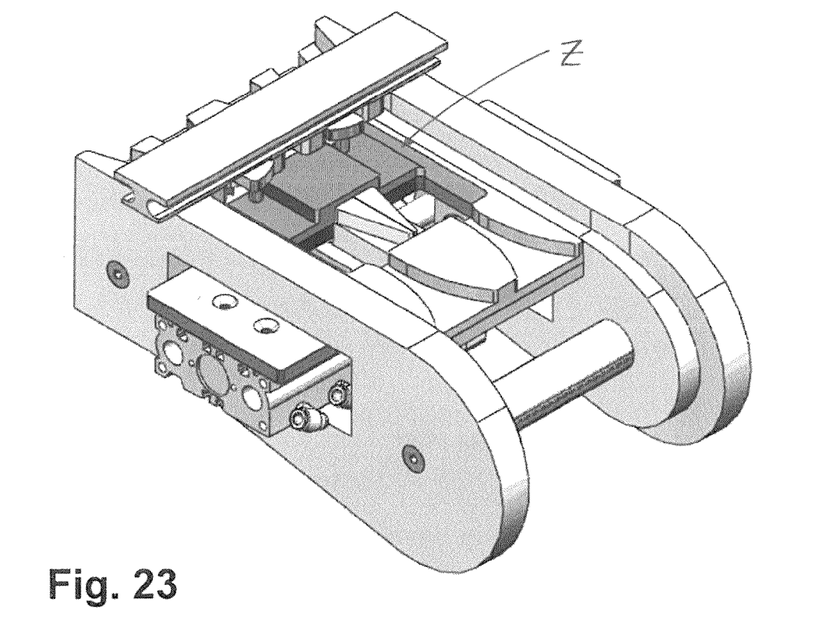

Turning to FIGS. 22 and 23, it is also noted that a zone Z is provided downstream of the actuator 36 for allowing the guides 28a, 28b to assume the proper condition (as the result of the magnetic coupling) prior to being engaged by the dividers 38a, 38b. The particular length of the zone in the conveying direction may be adjusted depending on the speed of operation.

Figure 1A:
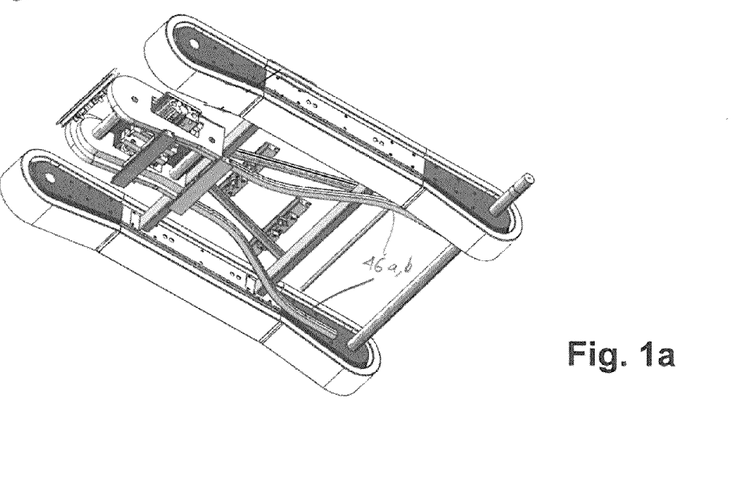

Finally, FIGS. 1 and 1a illustrate the downstream guidance that may be provided. Specifically, along the forward run, guide rails 44a, 44b cause the movement of the diverters to the desired position, such as along the left or right side of the conveyor 12. Likewise, guide rails 46a, 46b along the return run cause the diverters 20 to return to the central position. As should be appreciated, the position of the guides 26a, 26b is not relevant for continued operation, since it will be reset prior to entering the switch 30.

Numerous advantages flow from practicing the foregoing teachings. Aside from the simplicity, an advantage of the proposed approach is that it avoids the need for moving a diverter from along one lateral side of the conveyor to another. Rather, the diverter can be moved from the central or intermediate position to either side, which will decrease the longitudinal distance required to make the diversion. The central location and the lack of guidance in the intermediate position also eliminate the past problem of constant friction and resulting wear. The particular nature of the actuator 36 also helps to avoid the possibility of collisions and ensure that proper guidance is achieved in a reliable manner, thus allowing for the desired high speed of operation to be achieved in order to answer modern throughput demands.

With the exceptions described above for forming the magnetic coupling, the diverter 20 and its associated components may be formed of any durable material, with UHMW polyethylene, polypropylene or Acetal being preferred choices because of the high durability, relatively low weight, and low cost of such materials. Using these materials results in a substantially strong structure for contacting the articles, and one not prone to oxidation and rust. However, the diverter 20 and other components may be formed of any material, including metal or other polymers, without limitation.

The foregoing descriptions of various embodiments of the invention are provided for purposes of illustration, and are not intended to be exhaustive or limiting. Modifications or variations are also possible in light of the above teachings. The embodiments described above were chosen to provide the best application to thereby enable one of ordinary skill in the art to utilize the disclosed inventions in various embodiments and with various modifications as are suited to the particular use contemplated. All such modifications and variations are within the scope of the invention.

The invention claimed is:

1. An apparatus for intended use in connection with a conveyor for conveying articles in a conveying direction along at least three different paths, comprising:
   a diverter for moving in the conveying direction along an intermediate path of travel, the diverter having a plurality of movable guides including a first guide mounted for relative movement to a first position corresponding to a first path of diverter travel closer to one side of the conveyor and a second guide mounted for relative movement to a second position corresponding to a second path of diverter travel closer to a second side of the conveyor; and
   a switch having a first condition for engaging the first guide to cause the diverter to follow the first path, a second condition for engaging the second guide to cause the diverter to follow the second path, or a third condition for allowing the diverter to follow the intermediate path of travel.

2. The apparatus of claim 1, wherein the switch comprises a first portion adapted for engaging the first guide in the first position and a second portion adapted for engaging the second guide in the second position.

3. The apparatus of claim 2, further including an actuator for moving the first portion of the switch to engage the first guide and the second portion of the switch to engage the second guide.

4. The apparatus of claim 3, further including a limiter for limiting the stroke of the actuator.

5. The apparatus of claim 3, wherein the actuator comprises a first actuator connected to the first portion of the switch and a second actuator connected to the second portion of the switch.

6. The apparatus of claim 1, further including a first magnetic coupling for holding the first guide in either the first position or the second position, and a second magnetic coupling for holding the second guide in either the first position or the second position.

7. The apparatus according to claim 1, further including a reset guide upstream of the switch for moving the first guide to the second position and the second guide to the first position.

8. The apparatus according to claim 1, further including a first divider downstream of the switch for engaging the first guide in the first position and a second divider downstream of the switch for engaging the second guide in the second position.

9. The apparatus according to claim 8, further including a dead zone between the switch and the first or second dividers.

10. A method for conveying articles in a conveying direction along a first path of travel or a second path of travel, comprising:
    conveying a diverter including a plurality of guides along an intermediate path, the diverter including a first guide mounted for movement to a first position adjacent one side of the diverter corresponding to the first path of travel closer to a first side of the conveyor than the intermediate position and a second guide mounted for movement to a second position adjacent another side of the diverter corresponding to the second path of travel closer to another side of the conveyor than the intermediate position.

11. The method of claim 10, further comprising the step of holding each guide in either the first position or the second position by way of a magnetic coupling between the diverter and the guide.

12. An apparatus for intended use in connection with a conveyor for conveying articles in a conveying direction, comprising:
    at least one diverter for moving in the conveying direction along a central path of travel, the diverter having a first movable guide mounted for relative movement to a first position corresponding to a first path of diverter travel closer to one side of the conveyor and a second position corresponding to the central path of travel;
    a switch for engaging the first guide to cause the diverter to follow the first path; and
    a reset guide upstream of the switch for moving the first guide to the second position.

13. The apparatus of claim 12, wherein the diverter includes a second guide mounted for relative movement to a third position corresponding to a second path of diverter travel closer to one side of the conveyor and a fourth position.

14. The apparatus of claim 13, wherein the switch comprises a first portion adapted for engaging the first guide in the first position and a second portion adapted for engaging the second guide in the third position.

15. The apparatus of claim 13, wherein the switch comprises an actuator for moving the first portion of the switch to engage the first guide and the second portion of the switch to engage the second guide.

16. The apparatus of claim 15, further including a limiter for limiting the stroke of the actuator.

17. The apparatus of claim 15, wherein the actuator comprises a first actuator connected to the first portion of the switch and a second actuator connected to the second portion of the switch.

18. The apparatus of claim 12, further including a first magnetic coupling for holding the first guide in either the first position or the second position.

19. The apparatus according to claim 12, further including a first divider downstream of the switch for engaging the first guide in the first position.

20. A method for conveying articles in a conveying direction along a first path of travel or a second path of travel, comprising:
- conveying a diverter including a plurality of movable guides along a central path of travel between the lateral sides of the conveyor, each guide having a first position and a second position;
- holding one guide in either the first position to move the diverter from the central path of travel to closer to one lateral side or the second position to move the diverter from the central path of travel to closer to another lateral side.

21. The apparatus of claim 12, wherein the switch is positioned along the central path of travel.

\* \* \* \* \*